(No Model.) 2 Sheets—Sheet 1.
C. WAGNER.
ELASTIC TIRE.
No. 482,819. Patented Sept. 20, 1892.
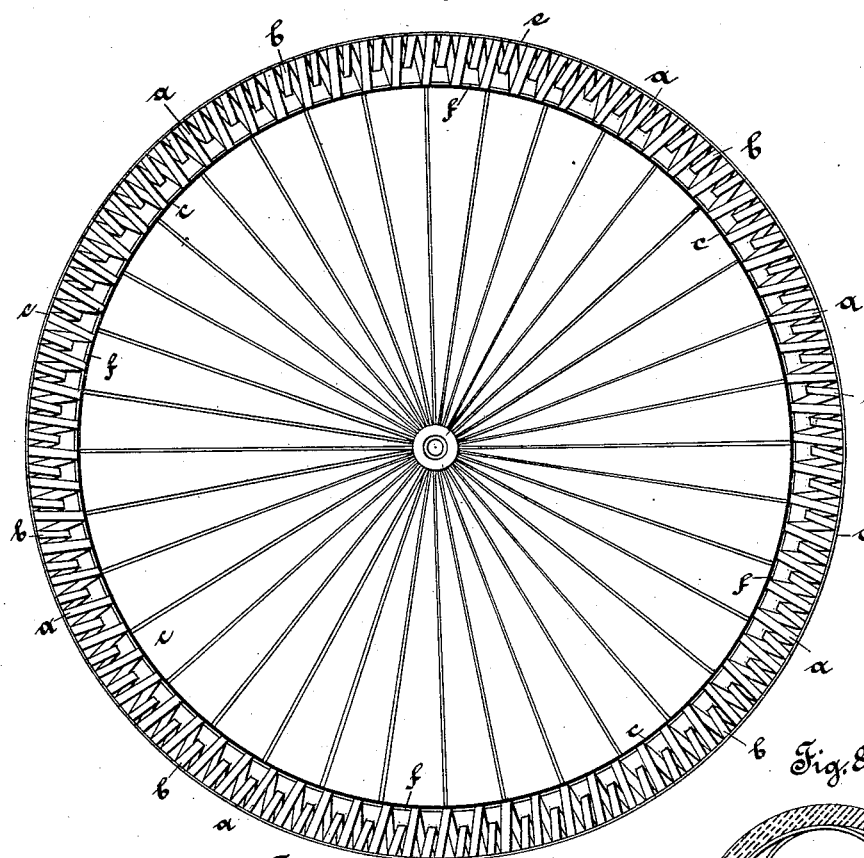
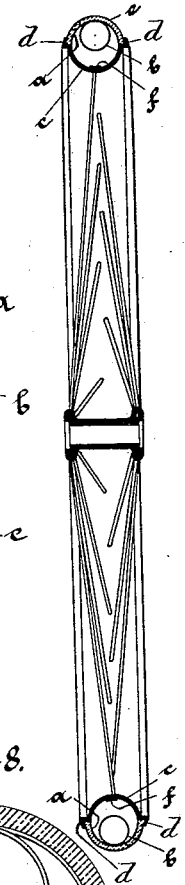
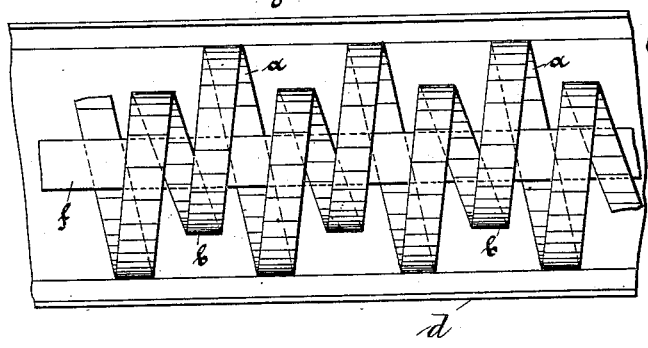
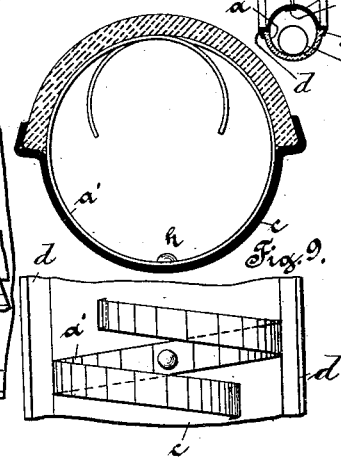

(No Model.) C. WAGNER. 2 Sheets—Sheet 2.
ELASTIC TIRE.
No. 482,819. Patented Sept. 20, 1892.
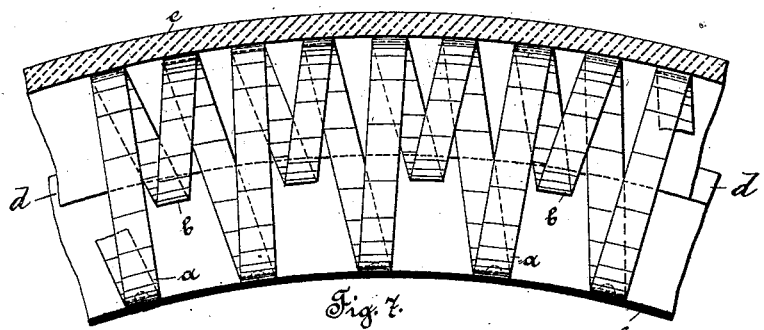
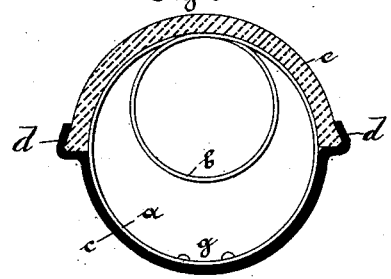
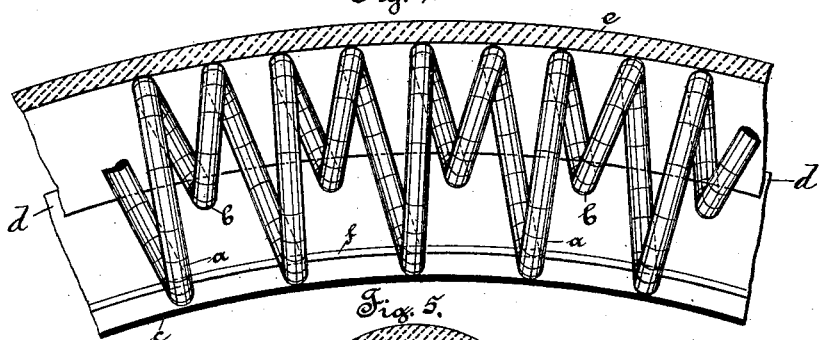
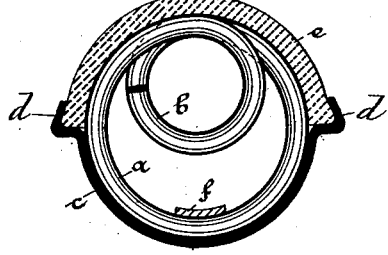
Witnesses:
Inventor: Curt Wagner, by his attorney

UNITED STATES PATENT OFFICE.

CURT WAGNER, OF OEDERAN, GERMANY.

ELASTIC TIRE.

SPECIFICATION forming part of Letters Patent No. 482,819, dated September 20, 1892.

Application filed January 28, 1892. Serial No. 419,543. (No model.)

*To all whom it may concern:*

Be it known that I, CURT WAGNER, a subject of the King of Saxony, residing at Oederan, in the Kingdom of Saxony, German Empire, have invented certain new and useful Improvements in Elastic Tires, of which the following is a specification.

The tire which forms the subject of this invention differs from the usual india-rubber tires, both solid and hollow, (or pneumatic,) in the arrangement within it of one or more springs adapted to sustain and compensate the weight of the vehicle, the external casing or cover forming the tire proper and inclosing such springs being made of any suitable elastic material. The arrangement in its simplest form consists of a spiral spring placed round the felly or rim of the wheel, the spring being either flat or of circular section. A number of separate springs of substantially circular shape may also, however, be arranged round the periphery of the wheel and riveted thereto one by one; or the springs may be secured beforehand to one continuous band or hoop to be passed over or embodied in the felly.

Spring-controlled tires of this description share the advantages of the ordinary pneumatic tires in that they are extremely yielding and productive of easy and smooth motion, while they do not participate in the inconveniences of the pneumatic tires, which when in the least damaged remain inoperative unless constantly refilled with air.

A further important advantage of the improved tire herein described is that the external casing or covering of india-rubber or the like may when worn out be replaced with facility and at little cost.

In the accompanying drawings I have represented some of the forms in which this invention may be carried out, Figures 1 to 5 showing the arrangement of one continuous spiral spring, and Figs. 6 to 9 a modification in which a series of separate springs are employed.

In Figs. 1 to 3 it is assumed that the spiral spring is flat, and in Figs. 4 and 5 it is shown to be of circular section. The peculiarity of these spiral springs is that they are wound in such a manner as to form alternately large convolutions $a$ and small convolutions $b$. By this method of winding various objects are attained, though it does not necessarily exclude the use of any ordinary spiral spring the employment of which would be within the scope of my invention. Ordinary spiral springs, however, are likely to present this disadvantage, that the outer circle of the wheel, being of course the largest one, the convolutions of the spring would radiate toward the outside— i. e., be spread farther apart externally and be farther compressed inwardly—and in so doing it is to be feared that they will form too wide spaces between them to be of any service as supports of the external covering or tire proper. The form of spiral springs represented in the drawings avoids this drawback by enabling the convolutions to be set close together at the periphery of the wheel, while at the same time leaving sufficient play for the larger convolutions to be radially compressed within, a sufficient and equally-divided support being thus afforded to the exterior elastic ring. Half of the spring being, moreover, embedded in the elastic tire, the upper half only of each convolution sustains and yields to the weight of the rider, and if an ordinary spiral spring were used its convolutions would be liable to be bent out of shape at the top, which is the part most strained. This again is avoided by the arrangement shown, in which the yielding power of the spring is equally divided throughout the circle, owing to the compensating action of the small loops or convolutions $b$, alternating with the large ones $a$.

$c$ is the felly or rim, semicircular in section and provided with angular flanges $d$, into which are inserted the edges of the external india-rubber band or tire proper $e$, which is retained in this position by the spring it incloses. The fastening of the india-rubber or the like may, however, be effected in any other suitable manner, if required. To prevent a displacement of the spring $a\,b$ in relation to the rim of the wheel, an iron band or hoop $f$ may be passed through the larger convolutions and around the rim, and some of the convolutions at suitable intervals apart may be riveted or screwed to it.

The arrangement shown in Figs. 6 and 7 differs from that which has just been described in this particular only, that instead of one continuous spring a series of individual springs *a b a* are here employed, the wider convolutions *a* meeting in pairs at *g* upon the rim of the wheel, to which the ends of these springs *a* are riveted or otherwise secured.

In the modification shown in Figs. 8 and 9 the springs *a'* are bent circularly, so that their ends overlap, and are secured at their center to the wheel-rim at *h*.

If an india-rubber band or covering *e* be used, care should be taken that the material is of the very best quality—such as is now used in preference for pneumatic tires—so that the danger of its being injured by the metal spring is obviated, and the rubber band *e* may for this purpose be further protected by the interposition of a strip of a suitable strong fabric between it and the spring or springs.

I claim—

1. The combination, with a semicircular rim or felly of a wheel provided at its upper lateral edges with bearing-surfaces, of a semicircular elastic tire having its ends seated upon said bearing-surfaces of the tire and secured to the latter and a spring arranged intermediate the tire and felly and having alternate large and small convolutions, said spring forming a yielding support for the tire intermediate its ends, as described, for the purpose specified.

2. The combination, with a semicircular rim or felly of a wheel provided at its upper lateral edges with bearing-surfaces, of a semicircular elastic tire having its ends seated upon said bearing-surfaces of the tire and secured to the latter, a spring arranged intermediate the tire and felly and having alternate large and small convolutions, said spring forming a yielding support for the tire intermediate its ends, and a band engaging the larger convolutions of the spring and encircling the felly for the purpose of securing the said spring in place, as described.

In witness whereof I have hereunto set my hand in the presence of two subscribing witnesses.

CURT WAGNER.

Witnesses:
R. E. JAHN,
EUGEN A. FRAISSINET.